United States Patent
Huang (10) Patent No.: US 8,763,624 B1
(45) Date of Patent: Jul. 1, 2014

(54) SWITCH STRUCTURE OF WATER OUTLET OF WALL-MOUNTED FAUCET

(71) Applicant: Li-Chen Huang, Changhua (TW)

(72) Inventor: Li-Chen Huang, Changhua (TW)

(73) Assignee: Alexander Yeh Industry Co. Ltd., Changhua (TW)

( * ) Notice: Subject to any disclaimer, the term of this patent is extended or adjusted under 35 U.S.C. 154(b) by 0 days.

(21) Appl. No.: 13/783,888

(22) Filed: Mar. 4, 2013

(51) Int. Cl.
*G05D 11/00* (2006.01)

(52) U.S. Cl.
USPC .......... 137/119.05; 137/467; 137/801; 4/678; 251/229; 251/339

(58) Field of Classification Search
CPC  F16K 11/0445; E03C 1/0404; E03C 2201/30
USPC ........... 4/678; 137/119.05, 119.08, 467, 801; 251/229, 236, 244, 339
See application file for complete search history.

(56) References Cited

U.S. PATENT DOCUMENTS

| | | | | |
|---|---|---|---|---|
| 2,128,627 A * | 8/1938 | Vogt | ............................. | 251/155 |
| 2,206,609 A * | 7/1940 | Klein | ............................ | 137/467 |
| 3,507,420 A * | 4/1970 | Nelson et al. | ................... | 222/20 |
| 4,015,632 A * | 4/1977 | Frahm et al. | ................... | 137/801 |
| 4,171,005 A * | 10/1979 | Nicklas | ......................... | 137/467 |
| 4,606,370 A * | 8/1986 | Geipel et al. | ............ | 137/119.05 |
| 8,176,580 B2 * | 5/2012 | Kajuch et al. | ..................... | 4/678 |
| 8,376,249 B2 * | 2/2013 | Huang | ....................... | 239/587.5 |
| 8,424,558 B2 * | 4/2013 | Huang | .......................... | 137/360 |
| 8,566,975 B1 * | 10/2013 | Lin | .................................. | 4/678 |
| 2012/0234419 A1 * | 9/2012 | Hsieh | .......................... | 137/801 |

* cited by examiner

*Primary Examiner* — Craig Schneider
*Assistant Examiner* — R. K. Arundale
(74) *Attorney, Agent, or Firm* — Che-Yang Chen; Law Office of Michael Chen (57) ABSTRACT

A water output switch structure of a faucet includes a water output head having a water inlet tube inside that includes a switch valve inside to change water output status of the water output head, a water output cover underneath the water output head, a control unit and a button disposed on the water output cover.

10 Claims, 7 Drawing Sheets

SWITCH STRUCTURE OF WATER OUTLET OF WALL-MOUNTED FAUCET

FIELD OF THE INVENTION

The present invention relates to a switch structure of a wall-mounted faucet's water outlet, and more particularly to a switch structure of a wall-mounted faucet's water outlet that is underneath the faucet.

BACKGROUND OF THE INVENTION

For some faucets that can be used for showing and bathtub, there are usually two ways to output water: one is directly from the upper portion of the bathtub to provide a significant amount of water in the bathtub for the user; and the other is to connect to the shower head for the user taking shower. When these two different ways to output water are used in one faucet, the user uses a switch valve to switch the way of water output. Namely, when the faucet is turned on, the water is usually flowing from the faucet to the container underneath (bathtub), and when the user wants to switch another way of water output, the user pulls up the switch to close the water channel to the faucet, so the water ends up spraying out from the shower head. Meanwhile, the switch valve is supported by the water pressure so it would not fall down until the water source is shut. And the water pressure inside the faucet starts decreasing and the switch valve falls down when the water pressure is less than the weight of the switch valve.

However, the conventional structure still has some problems: (i) when in use, a switch valve will protrudes from the upper portion of the faucet, which is not appropriately hidden and would decrease the aesthetic value of the faucet, and (ii) the protruding switch valve may be inadvertently touched to change the water output status without warning. Therefore, there remains a need for a new and improved switch structure of the faucet to overcome the problems stated above.

SUMMARY OF THE INVENTION

The technical problem the present invention wants to solve is described above and the present invention provides a switch structure of a faucet including a water output head, a water inlet tube, a switch valve, a water output cover, a control unit, and a button. A stopping wall inside the water output head is used to separate a downward water output chamber and a rear tubular body. The stopping wall has a connecting hole, and the water inlet tube has a corresponding first tubular body and second tubular body. A stopping edge is located inside the first tubular body and a bracket is suspended at front end thereof. Center of the bracket has a sleeve opening, periphery of which has at least one surrounding through hole, and the water inlet tube is inside the rear tubular body and connected thereof through the first tubular body and the connecting holes, so that the water inlet tube is used to connect water source. The switch valve has a valve stick that is inside the sleeve opening and extended toward front and rear ends of the first tubular body. The valve stick has a water stopping unit, and a spring is disposed between the water stopping unit and the bracket of the first tubular body. With the spring, the valve stick can be pushed backwards to prevent the water stopping unit from blocking the stopping edge of the first tubular body, which causes the closing of the water stream. The rear end of the valve stick is supported by a restricting cover, and a plurality of supporting legs are surrounded at the periphery of the restricting cover. The supporting legs are provided for the first tubular body and second tubular body, so that the restricting cover can be secured in the water inlet tube, and a groove is disposed at the front end of the water output chamber for the valve stick to extend into. The water output cover has a circular cover, front of which having water output holes disposed in an arc manner. A hinge base is upwardly formed on both sides and a ladder-shaped installation hole is downwardly disposed at the rear end thereof. The water output cover is disposed on the opening of the water output chamber after putting in internal components, so the water output cover is used to seal the water output chamber, and a gasket is disposed between the water output cover and the water output head. The control unit has a flat board, front end of which has a curved piece forming a back arc at an upper portion thereof, so a wedging slot can be formed at top center of the curved piece. A hinged portion is disposed at the boarder of the flat board and both sides of the curved piece, so that the control unit can used to the hinged portion to be disposed between two hinged bases of the water output cover. Meanwhile, the wedging slot generates a clamping effect to the groove of the valve stick, so that the control unit and the valve stick can be mutually linked. The button (60) has a rod and a head base is formed at an enlarging bottom portion of the button. The rod is inserted from the installation hole of the bottom surface of the water output cover to move upward until touching the flat board. A button gasket is disposed on the rod to be against the ladder-shaped installation hole to prevent the button from falling out.

Comparing with the prior arts, the present invention has the following advantages: (i) the button is hidden underneath the water output head to increase the aesthetic value; and (ii) the button is hidden underneath the water output head to avoid inadvertently touch to change the water output status without warning.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 5, the present invention includes a water output head (10), a water inlet tube (20), a switch valve (30), a water output cover (40), a control unit (50) and a button (60). A stopping wall (11) inside the water output head (10) is used to separate a downward water output chamber (12) and a rear tubular body (13). The stopping wall (11) has a connecting hole (111), and the water inlet tube (20) has a corresponding first tubular body (21) and second tubular body (22). A stopping edge (211) is located inside the first tubular body (21) and a bracket (212) is suspended at front end thereof. Center of the bracket (212) has a sleeve opening (213), periphery of which has at least one surrounding through hole (214), and the water inlet tube (20) is inside the rear tubular body (13) and connected thereof through the first tubular body (21) and the connecting holes (111), so that the water inlet tube (20) is used to connect water source (70). The switch valve (30) has a valve stick (31) that is inside the sleeve opening (213) and extended toward front and rear ends of the first tubular body (21). The valve stick (31) has a water stopping unit (32), and a spring (33) is disposed between the water stopping unit (32) and the bracket (212) of the first tubular body (21). With the spring (33), the valve stick (31) can be pushed backwards to prevent the water stopping unit (32) from blocking the stopping edge (211) of the first tubular body (21), which causes the closing of the water stream. The rear end of the valve stick (31) is supported by a restricting cover (34), and a plurality of supporting legs (341) are surrounded at the periphery of the restricting cover (34). The supporting legs (341) are provided for the first tubular body (21) and second tubular body (22), so that the restricting cover (34) can be secured in the water inlet tube (20), and a groove (311) is disposed at the front end of the water output chamber (12) for the valve stick (31) to extend into. The water output cover (40) has a circular cover (41), front of which having water output holes (411) disposed in an arc manner. A hinge base (412) is upwardly formed on both sides and a ladder-shaped installation hole (413) is downwardly disposed at the rear end thereof. The water output cover (40) is disposed on the opening of the water output chamber (12) after putting in internal components, so the water output cover (40) is used to seal the water output chamber (12), and a gasket (42) is disposed between the water output cover (40) and the water output head (10). The control unit (50) has a flat board (51), front end of which has a curved piece (52) forming a back arc at an upper portion thereof, so a wedging slot (53) can be formed at top center of the curved piece (52). A hinged portion (54) is disposed at the boarder of the flat board (51) and both sides of the curved piece (52), so that the control unit (50) can be disposed between two hinged bases (412) of the water output cover (40) using the hinged portion (54). Meanwhile, the wedging slot (53) generates a clamping effect to the groove (311) of the valve stick (31), so that the control unit (50) and the valve stick (31) can be mutually linked. The button (60) has a rod (61) and a head base (62) is formed at an enlarging bottom portion of the button (60). The rod (61) is inserted from the installation hole (413) of the bottom surface of the water output cover (40) to move upward until touching the flat board (51). A button gasket (63) is disposed on the rod (61) to be against the ladder-shaped installation hole (413) to prevent the button (60) from falling out.

Figure 1:
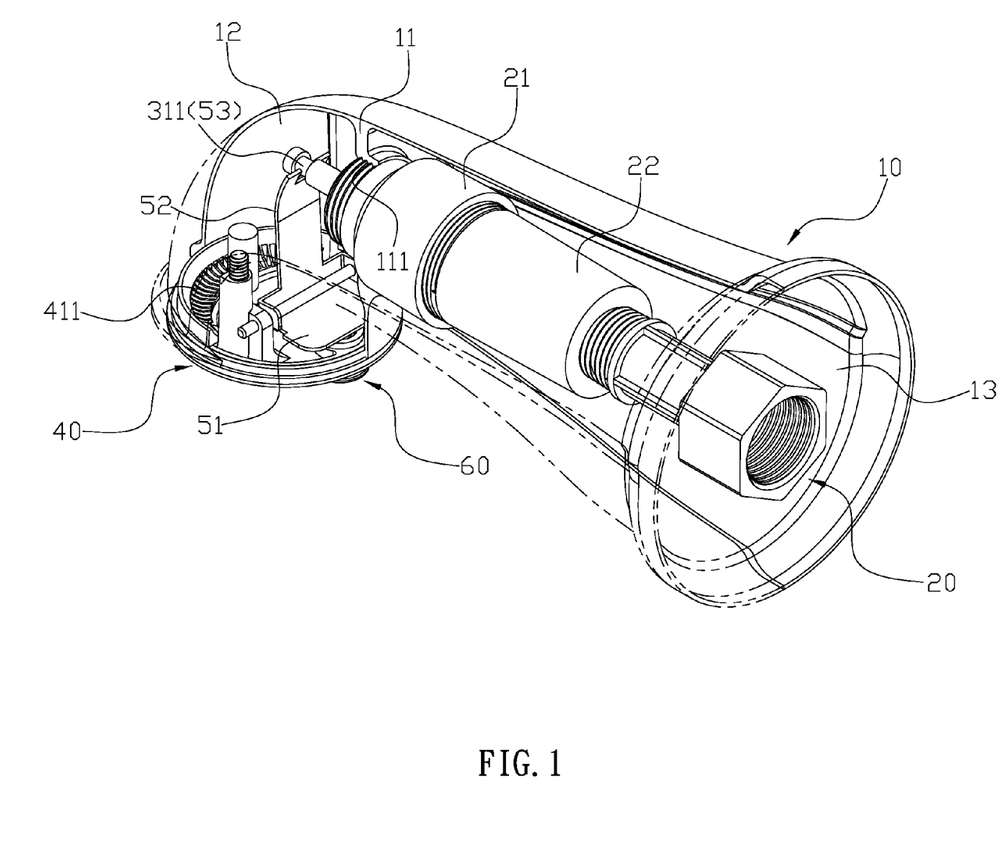
FIG. 1 illustrates a three-dimensional assembled view of the present invention.
Figure 2:
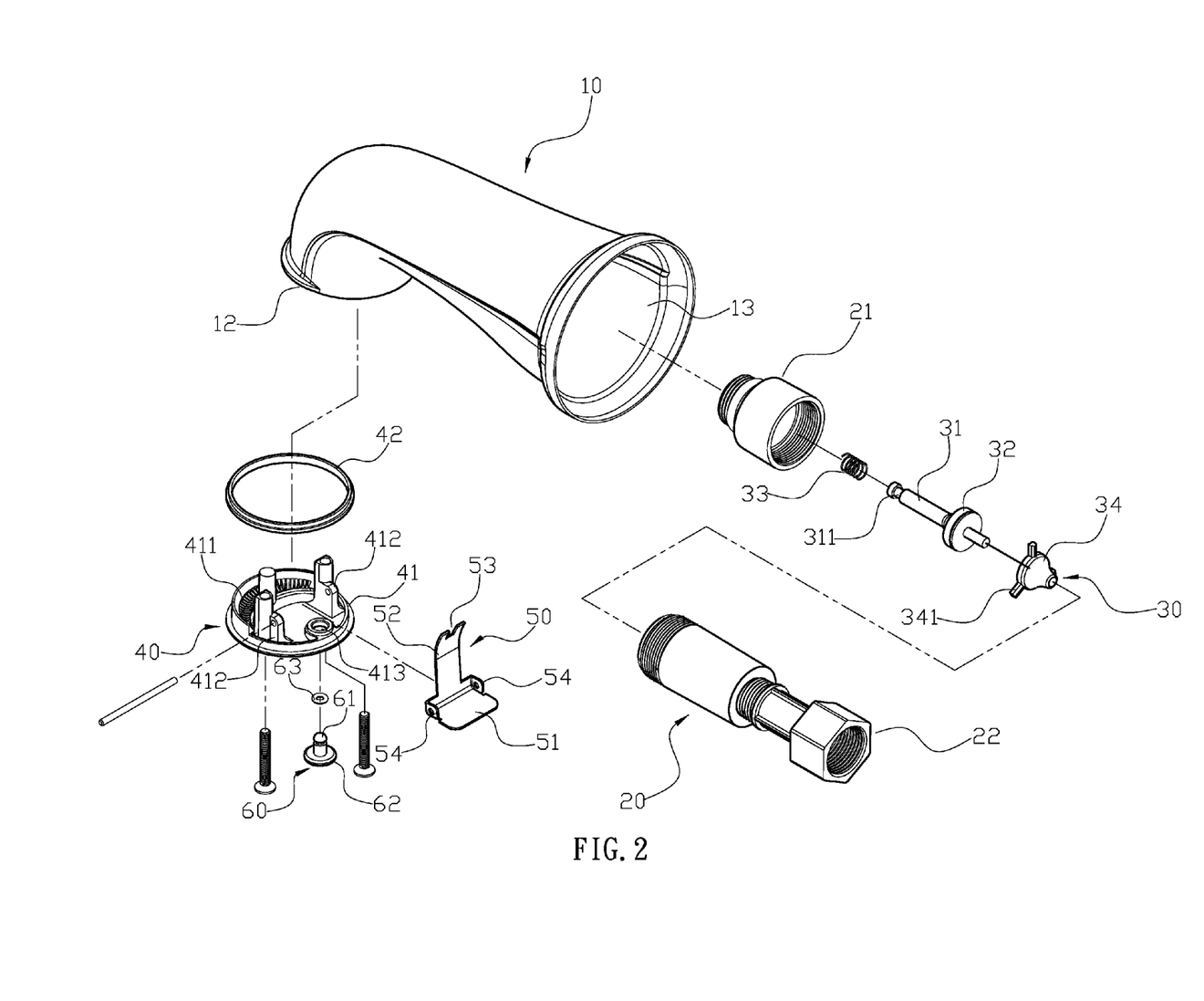
FIG. 2 illustrates a three-dimensional exploded view of the present invention.
Figure 3:
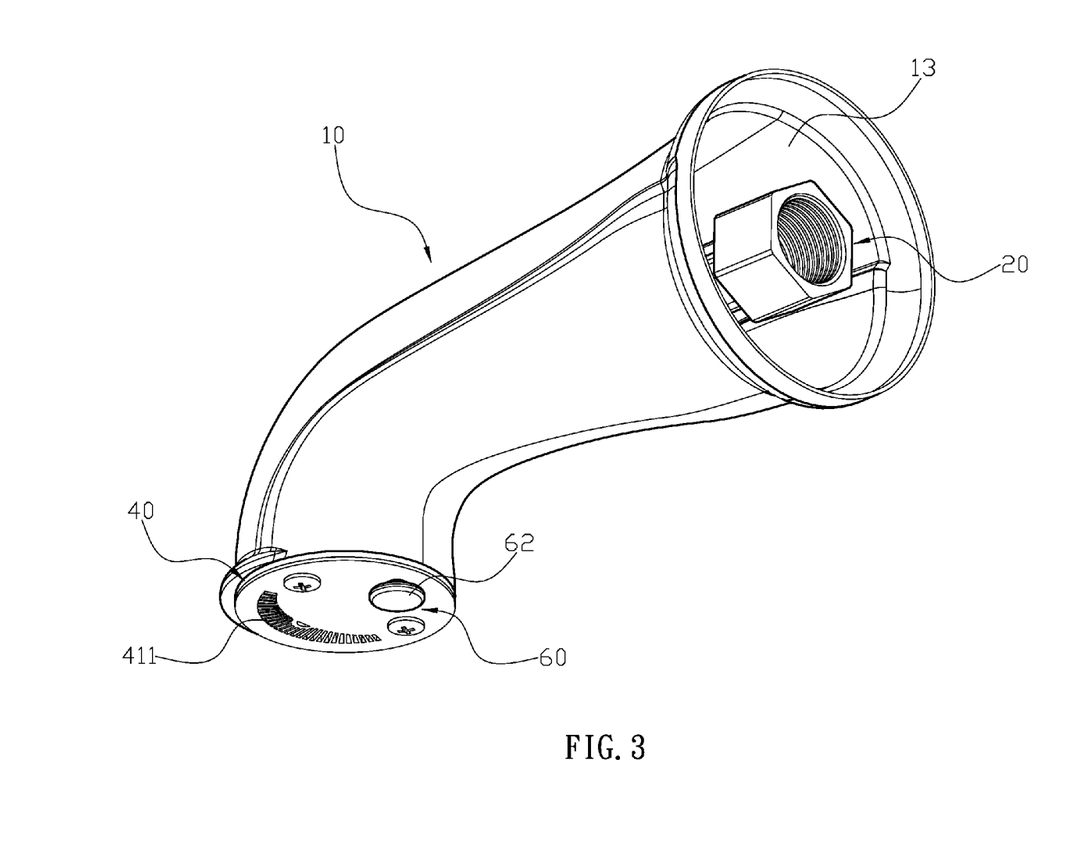
FIG. 3 illustrates a three-dimensional assembled view from another angle of the present invention.
Figure 4:
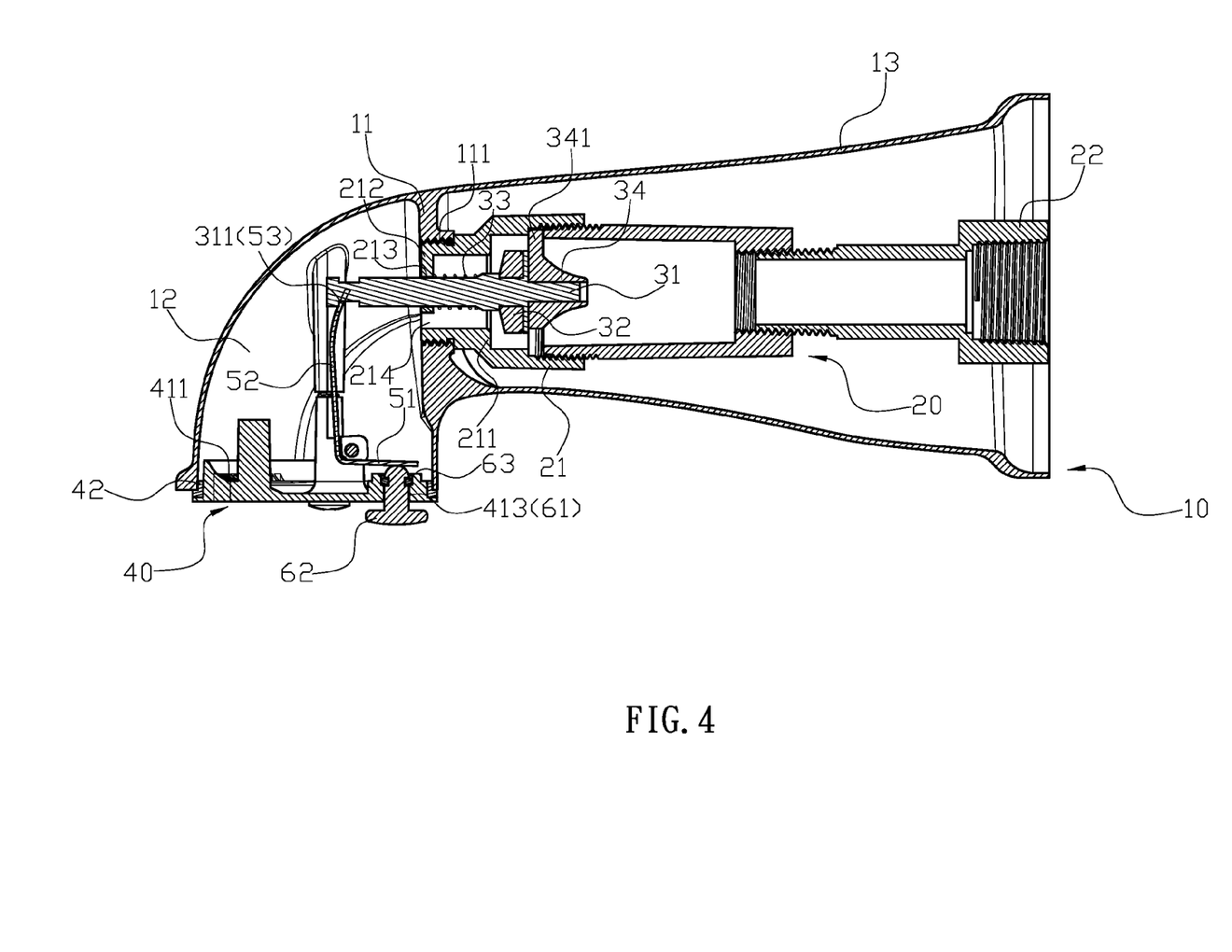
FIG. 4 illustrates a sectional assembled view of the present invention.
Figure 5:
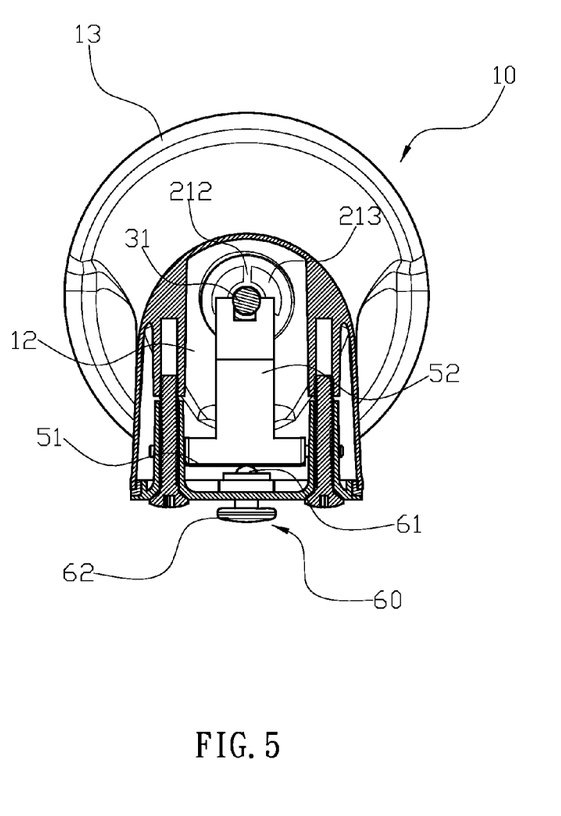
FIG. 5 illustrates a sectional assembled view from another angle of the present invention.
Figure 6:
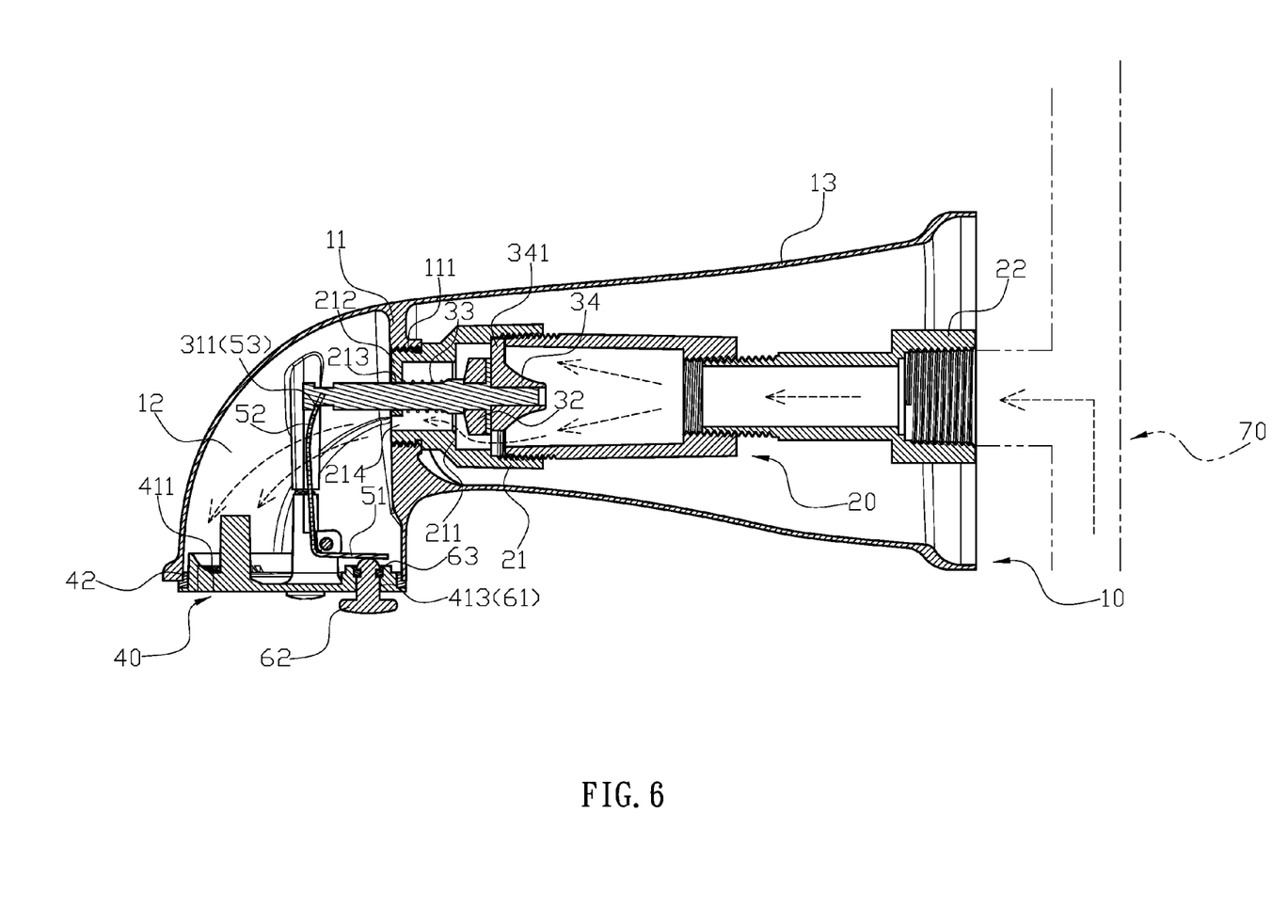
FIG. 6 illustrates water output from the lower portion in the present invention.
Figure 7:
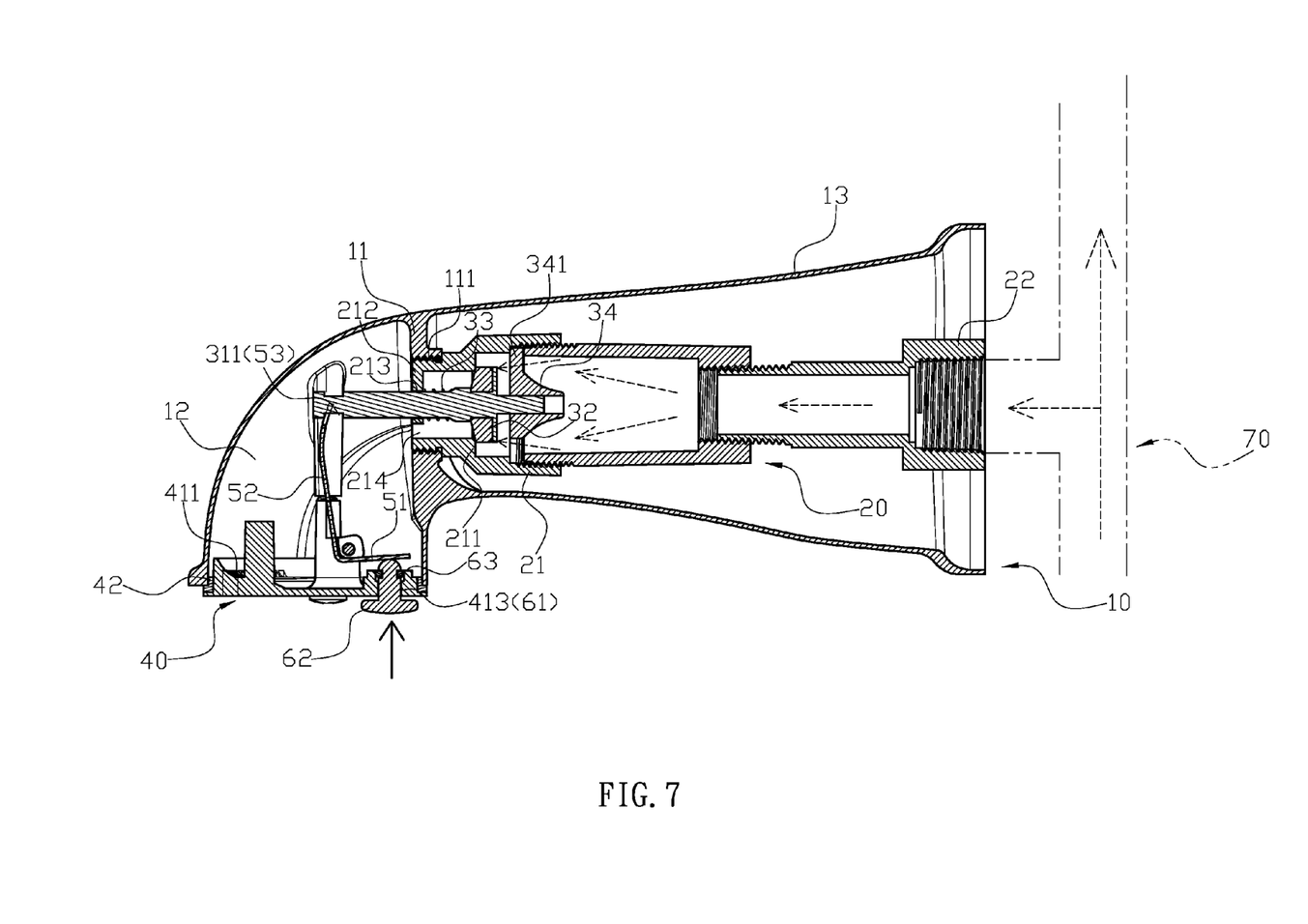
FIG. 7 illustrates water output from the upper portion in the present invention.

Referring to FIG. 6, when the button (60) is not used, the water will flow directly from the water source (70) to the water output chamber (12) through the water inlet tube (20) and the through hole (214) of the first tubular body (21). The water would flow out from the water output holes (411) of the water output cover (40) to accumulate the water in the container or bathtub underneath. When the head base (62) is lifted up (see FIG. 7), the rod (61) would be moved up as well to push up the flat board (51) at the rear end. Meanwhile, the flat board (51) drives the curved piece (52) leaning forward to use the clamp of the wedging slot (53) to trigger the valve stick (31) moving forward, so that the water stopping unit (32) can block the water flow on the stopping edge (211). At this time, the water would goes up to the shower head to spray out for users taking shower. Also, the valve stick (31) that has moved forward and the water stopping unit (32) that has been supported by water pressure would not rebound until the water source is shut. When the water pressure of the water faucet is reduced suddenly, the valve stick (31) and the water stopping unit (32) would be pushed back, so that the water output head (10) can work under normal conditions.

According to the embodiments described above, the present invention has the following advantages: (i) the button (60) is hidden underneath the water output head (10) to increase the aesthetic value; and (ii) the button (60) is hidden underneath the water output head (10) to avoid inadvertently touch to change the water output status without warning.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A water output switch structure of a faucet comprising a water output head having a water inlet tube inside the water output head that includes a switch valve inside to change a water output status of the water output head, a water output cover located underneath the water output head, a control unit and a button disposed on the water output cover, wherein the button is against a flat board of the control unit, and a curved pieced at front end of the flat board is used to connect with the switch valve, and when a user presses the button underneath the water output cover, the control unit is pushed up to hingedly rotate and drive the switch valve to move forward.

2. The water output switch structure of a faucet of claim 1, wherein a stopping wall inside the water output head is used to separate a downward water output chamber and a rear tubular body, and the stopping wall has a connecting hole to connect the water inlet tube in the tubular body, and the water output cover disposed on an opening of the water output chamber so as to seal the water output chamber.

3. The water output switch structure of a faucet of claim 2, wherein a gasket is disposed between the water output cover and the water output head.

4. The water output switch structure of a faucet of claim 1, wherein the water inlet tube has a corresponding first tubular body and second tubular body, and a stopping edge is located inside the first tubular body and a bracket is suspended at front end thereof, center of the bracket having a sleeve opening, a periphery of which has at least one surrounding through hole, and wherein the switch valve has a valve stick that is inside the sleeve opening and extended toward front and rear ends of the first tubular body, and the valve stick has a water stopping unit, and a spring is disposed between the water stopping unit and the bracket of the first tubular body, and with the spring, the valve stick is pushed backwards to prevent the water stopping unit from blocking the stopping edge of the first tubular body, which causes the closing of the water stream.

5. The water output switch structure of a faucet of claim 4, wherein a rear end of the valve stick is supported by a restricting cover, and a plurality of supporting legs surrounded at the periphery of the restricting cover are provided for the first tubular body and second tubular body, so that the restricting cover is secured in the water inlet tube.

6. The water output switch structure of a faucet of claim 1, wherein the switch valve has a valve stick having a groove disposed at front end thereof, the water output cover has a circular cover, front of which having water output holes and a hinge base is upwardly formed on both sides thereof, and the control unit has a flat board, a front end of which has a curved piece forming a back arc at an upper portion thereof, and a wedging slot is formed at a top center portion of the curved piece, and a hinged portion is disposed at the border of the flat board and both sides of the curved piece, so that the control unit is disposed between two hinged bases of the water output cover using the hinged portion, and the wedging slot generates a clamping effect to the groove of the valve stick, so that the control unit and the valve stick is mutually linked.

7. The water output switch structure of a faucet of claim 6, wherein the water output holes are disposed in an arc manner.

8. The water output switch structure of a faucet of claim 1, wherein the water output cover has a circular cover, front of which having water output holes and a ladder-shaped installation hole is downwardly disposed at the rear end thereof, and wherein the button has a rod and a head base is formed at an enlarging bottom portion of the button, and the rod is inserted from the installation hole of the bottom surface of the water output cover to move upward until touching the flat board.

9. The water output switch structure of a faucet of claim 8, wherein the water output holes are disposed in an arc manner.

10. The water output switch structure of a faucet of claim 8, wherein a button gasket is disposed on the rod to be against the ladder-shaped installation hole to prevent the button from falling out.

\* \* \* \* \*